United States Patent
Varadarajan et al.

(10) Patent No.: US 11,581,981 B2
(45) Date of Patent: *Feb. 14, 2023

(54) DYNAMIC MANAGEMENT OF PACKET LOSS

(71) Applicant: ZYCADA NETWORKS, INC., Milpitas, CA (US)

(72) Inventors: Subbu Varadarajan, Los Gatos, CA (US); Rosarin Roy Antonyraj, Sunnyvale, CA (US); Kumaravel Senthivel, San Jose, CA (US)

(73) Assignee: Zycada Networks, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,367

(22) Filed: Nov. 23, 2021

(65) Prior Publication Data

US 2022/0294566 A1    Sep. 15, 2022

Related U.S. Application Data

(63) Continuation of application No. 16/459,477, filed on Jul. 1, 2019, now Pat. No. 11,184,114, which is a
(Continued)

(51) Int. Cl.
*H04L 1/16* (2006.01)
*H04L 1/1607* (2023.01)
(Continued)

(52) U.S. Cl.
CPC .......... *H04L 1/1621* (2013.01); *H04L 1/0009* (2013.01); *H04L 1/08* (2013.01); *H04L 1/189* (2013.01); *H04L 1/1825* (2013.01); *H04L 43/0829* (2013.01); *H04L 43/16* (2013.01); *H04L 1/1809* (2013.01)

(58) Field of Classification Search
CPC ... H04L 1/1621; H04L 1/0009; H04L 1/1825; H04L 43/0829; H04L 43/16; H04L 1/189; H04L 1/08; H04L 1/1809
See application file for complete search history.

(56) References Cited

U.S. PATENT DOCUMENTS 10,396,939 B2 *  8/2019  Varadarajan .............. H04L 1/08
11,184,114 B2 * 11/2021  Varadarajan ............ H04L 43/16
(Continued)

*Primary Examiner* — Steven H Nguyen
(74) *Attorney, Agent, or Firm* — Morgan, Lewis & Bockius LLP

(57) ABSTRACT

Exemplary methods, apparatuses, and systems include duplicating a packet within a plurality of packets to be transmitted to a destination computing node as a sequence of packets. The plurality of packets including the duplicate of the packet are transmitted to the destination computing node. Upon receiving a first acknowledgement of the packet from the destination computing node, it is determined that the first acknowledgment is directed to a duplicated packet. In response to determining that the first acknowledgment is directed to a duplicated packet, it is determined that a second acknowledgement has yet to be received for each of one or more packets within the plurality of packets transmitted prior to the packet. In response to determining that the second acknowledgement has yet to be received, the one or more packets are retransmitted to the destination computing node.

20 Claims, 3 Drawing Sheets

Related U.S. Application Data continuation of application No. 15/602,023, filed on May 22, 2017, now Pat. No. 10,396,939.

(51) Int. Cl.
*H04L 43/0829* (2022.01)
*H04L 43/16* (2022.01)
*H04L 1/1867* (2023.01)
*H04L 1/08* (2006.01)
*H04L 1/00* (2006.01)
*H04L 1/1825* (2023.01)
*H04L 1/1809* (2023.01)

(56) References Cited

U.S. PATENT DOCUMENTS

2007/0206621 A1* 9/2007 Plamondon ......... H04L 67/2876
  370/413
2017/0070910 A1* 3/2017 Cartigny ................. H04L 47/11

* cited by examiner

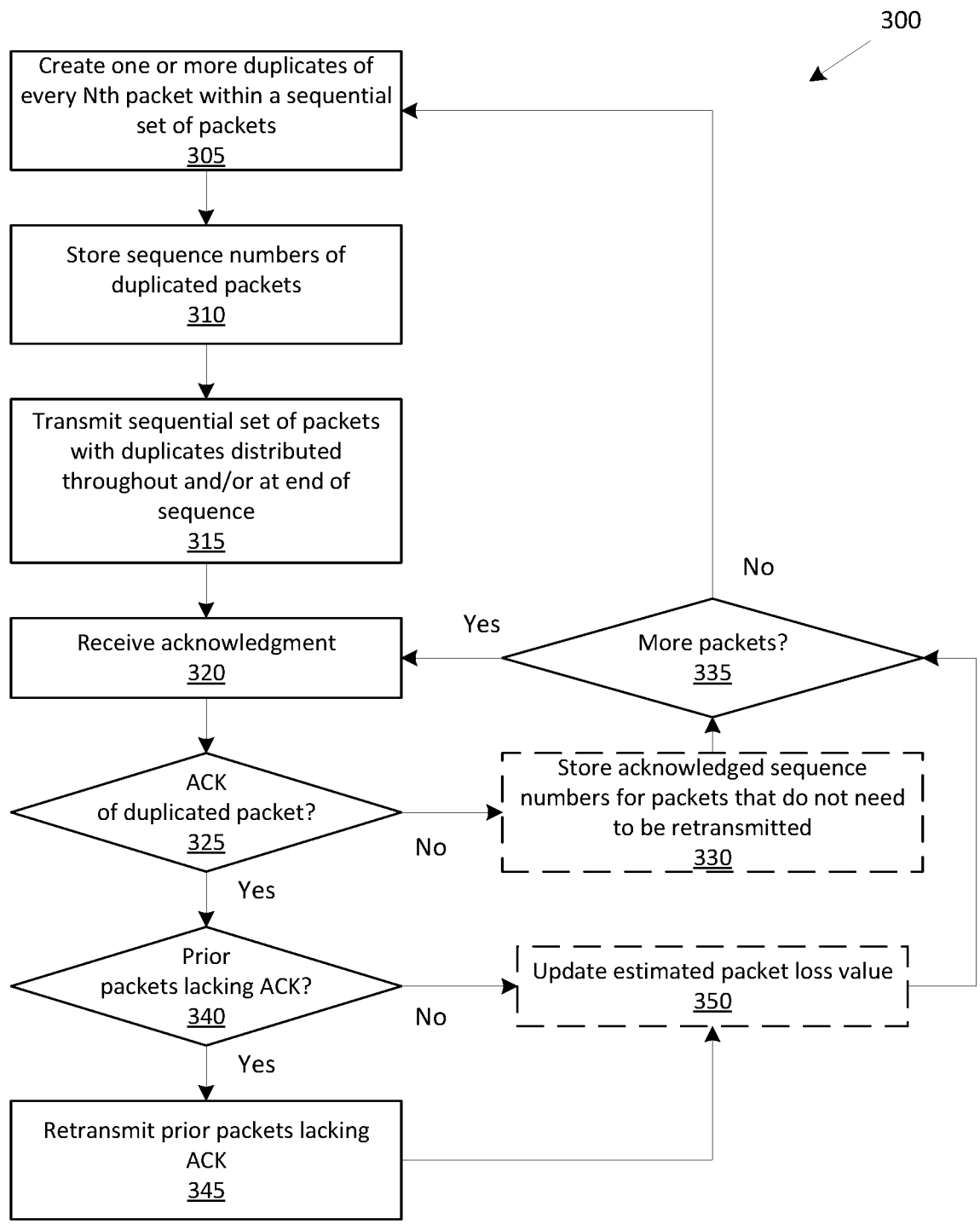

DYNAMIC MANAGEMENT OF PACKET LOSS

RELATED APPLICATIONS

This application is a continuation of U.S. patent application Ser. No. 16/459,477, filed on Jul. 1, 2019, entitled "Dynamic Management Of Packet Loss," which is a continuation of U.S. patent application Ser. No. 15/602,023, filed May 22, 2017 (now U.S. Pat. No. 10,396,939), entitled "Dynamic Management Of Packet Loss," each of which is herein incorporated by reference.

FIELD OF THE INVENTION

The various embodiments described in this document relate to managing packet loss. In particular, embodiments utilize extra copies of a subset of packets to increase the probability of receiving an acknowledgement of the duplicated packets and determine if non-duplicated packets have not been acknowledged based upon acknowledgement of duplicated packets.

BACKGROUND OF THE INVENTION

Network protocols, such as Transmission Control Protocol (TCP) utilize a retransmission timer to ensure that data that has not been acknowledged by the receiver is retransmitted. For example, such a timer may be set to a default value or a value based upon a measured round trip time between the sender and the receiver. When the timer expires before receiving acknowledgement of a packet, the packet is retransmitted and the length of the timer may be increased. With greater and varied amounts of packet loss, e.g., with wireless network connections, delivery of data may be slowed by waiting for the expiration of a retransmission timer to retransmit lost packets.

BRIEF DESCRIPTION OF THE DRAWINGS

The present embodiments are illustrated by way of example and not limitation in the figures of the accompanying drawings, in which like references indicate similar elements, and in which:

FIG. 3 is a flow chart illustrating an exemplary method of managing packet loss.

DETAILED DESCRIPTION

This document describes embodiments that manage packet loss by dynamically determining a number of duplicate copies of packets to transmit within a sequence of packets and utilizing acknowledgements of duplicated packets to detect the loss of non-duplicated packets. For example, embodiments create one or more duplicates of a packet within a plurality of packets to be transmitted to a destination computing node as a sequence of packets. The plurality of packets, including the one or more duplicates of the packet, are transmitted to the destination computing node. In transmitting multiple copies of the packet, the probability of the destination computing node receiving and acknowledging the packet increases. Upon receiving a first acknowledgement of the packet from the destination computing node, embodiments determine that the first acknowledgment is directed to a duplicated packet. In response to determining that the acknowledgment is directed to a duplicated packet, embodiments determine if an acknowledgement has not been received for one or more packets within the plurality of packets transmitted prior to the original copy of packet in the sequence. In response to determining that an acknowledgement has yet to be received for any of the one or more packets transmitted prior to the packet, embodiments retransmit the corresponding one or more packets to the destination computing node. In an embodiment, the number of packets to be duplicated and/or the number of duplicate copies created are set based upon a determined amount of packet loss. As a result, embodiments detect and react to the loss of packets prior to the expiration of a retransmission timer while dynamically adjusting the amount of duplicate packets transmitted.

Figure 1:
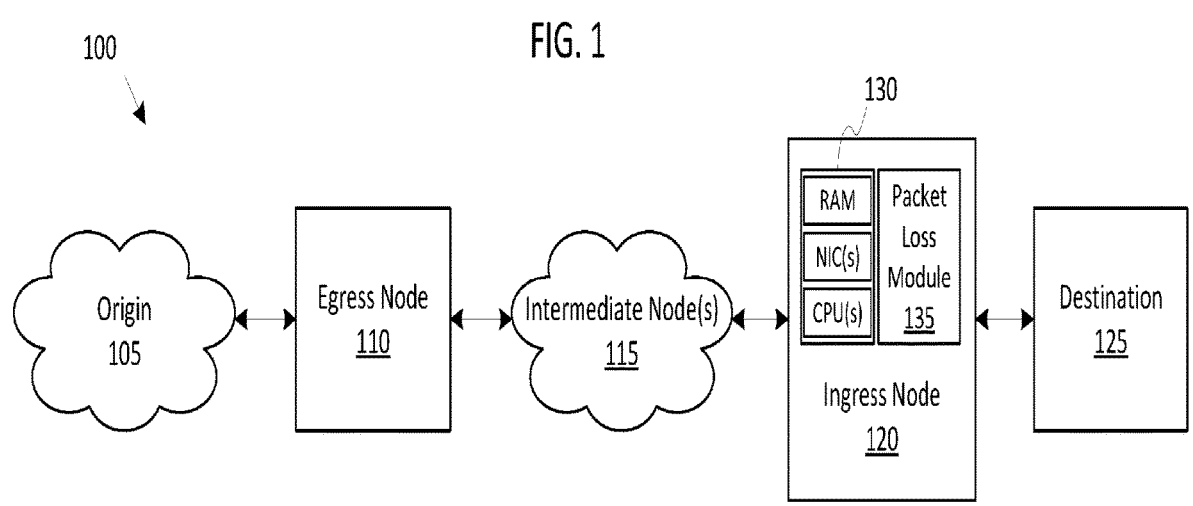
FIG. 1 illustrates, in block diagram form, processing devices that make up a network and implement embodiments of management of packet loss.

FIG. 1 illustrates, in block diagram form, exemplary network 100 including processing devices, one or more of which implement embodiments of management of packet loss as described within this document. Data content is transmitted across network 100, e.g., from origin 105 to destination 125. The data is transmitted along a path that includes egress node 110, intermediate node(s) 115, and ingress node 120 before reaching destination 125. Origin 105 represents one or more processing devices such as an end user device (e.g., personal computer, mobile device, etc.) and/or servers. Similarly, destination 125 represents one or more processing devices such as an end user device (e.g., personal computer, mobile device, etc.) and/or servers. In one embodiment, destination 125 is an end user device coupled to network 100 via a wireless connection.

In one embodiment, one or more of egress node 110, intermediate node(s) 115, and ingress node 120 are a part of a content delivery network (CDN). The CDN includes a geographically distributed set of network server nodes deployed in multiple data centers. The CDN network server nodes are configured to serve content with high availability and performance.

Ingress Node 120 is illustrated as including hardware 130. Each of origin 105, egress node 110, intermediate node(s) 115, and destination 125 may also include similar hardware. Hardware 130 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. The memory may be internal or distributed memory. One or more buses (not shown) may be used to interconnect the various components of hardware 130. Additionally, NIC(s) may be used to connect ingress node 120, via a wired or wireless network, with intermediate node(s) 115 and destination 125.

Ingress Node 120 is illustrated as also including packet loss module 135. In one embodiment, packet loss module 135 monitors packet loss using duplicate packets and retransmits lost packets, e.g., as described with reference to FIGS. 2-3. In one embodiment, each of one or more of egress node 110 and intermediate nodes 115 also includes packet loss module 135.

Figure 2:
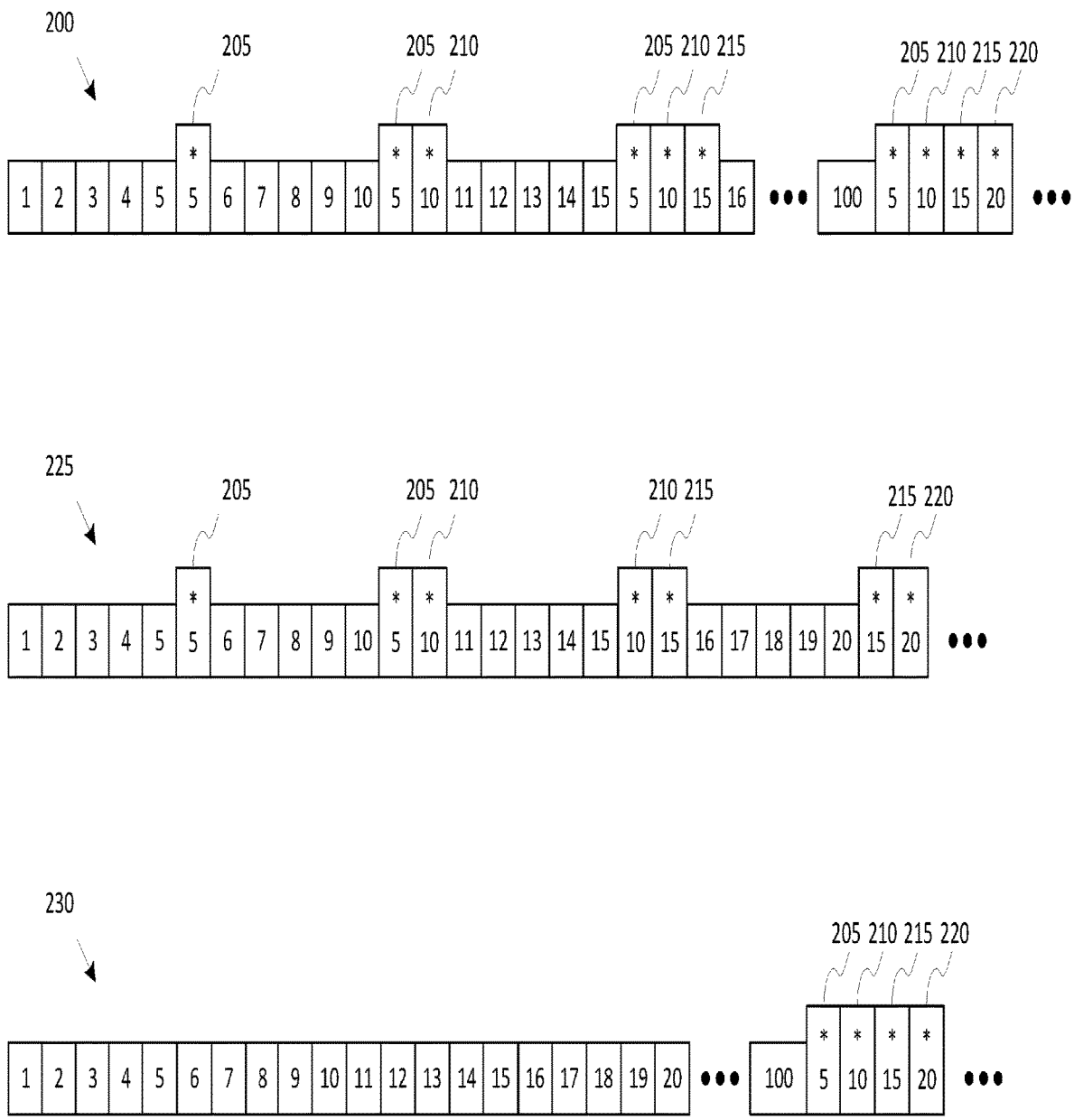
FIG. 2 illustrates three exemplary bursts of packets including extra copies of a subset of packets.

FIG. 2 illustrates exemplary bursts 200, 225, and 230 of packets including extra copies of a subset of packets. As illustrated, each of bursts 200, 225, and 230 includes a sequence of 100 packets. Bursts of packets, however, may include fewer or more packets than illustrated in this example. Each of bursts 200, 225, and 230 is illustrated as including duplicates of every Nth packet, where N=5. Duplicating every Nth packet provides for a minimum number of non-duplicated packets to be transmitted between duplicated packets. Duplicate copies of packets are illustrated with an asterisk to emphasize in the illustration that they are duplicates. For example, duplicate 205 is a copy of the fifth packet in the sequence, duplicate 210 is a copy of the tenth packet in the sequence, duplicate 215 is a copy of the fifteenth packet in the sequence, and duplicate 220 is a copy of the twentieth packet in the sequence. This pattern of duplication continues through the remainder of the sequence, as represented by the ellipses in FIG. 2. As described with reference to FIG. 3, the value of N may be variable and set based upon a default value or based upon a determined amount of packet loss in transmitting packets to destination 125.

In one embodiment, X copies of each duplicated packet is created and inserted into the sequence. For example, one or more copies of each duplicated packet may be inserted following the original copy of that packet and/or at the end of the sequence of packets. The greater the value of X, the greater the likelihood that destination 125 will receive and acknowledge the duplicated packet. bursts 200 and 225 is illustrated as having only a single duplicate 205 following immediately after the fifth packet. Similarly, burst 230 is illustrated as having only a single duplicate 205 following immediately after the one hundredth packet. In one embodiment, however, multiple duplicates 205 may follow immediately after the fifth packet (e.g., prior to the non-duplicated, sixth packet in the sequence), after the one hundredth packet, or elsewhere to increase the likelihood of receiving an acknowledgement of the fifth packet in the sequence. Similarly, multiple duplicates 210, 215, 220, etc. may be inserted immediately following their corresponding original packets or following the last packet in a burst. As described with reference to FIG. 3, the value of X may be variable and set based upon a default value or based upon a determined amount of packet loss in transmitting packets to destination 125.

In one embodiment, one or more copies of each duplicated packet (e.g., as defined by X as described above) is inserted following the original copy of that packet and following each subsequent duplicated packet in the sequence. For example, as illustrated, duplicate 205 of the fifth packet is inserted after the fifth packet and after each of the subsequent Nth packets (tenth, fifteenth, twentieth, etc.). Duplicate 210 of the tenth packet is inserted after the tenth packet and each of the subsequent Nth packets (fifteenth, twentieth, etc.). Distributing duplicates throughout burst 200 increases the likelihood that destination 125 will receive and acknowledge the duplicated packet even when there is a cluster of lost packets. Alternatively, the one or more copies of each duplicated packet is inserted only following the corresponding original copy of that packet and not following each subsequent duplicated packet in the sequence.

In another embodiment, a maximum number, M, of duplicated packets in the sequence is inserted at each point in in the burst. For example, as illustrated in burst 225, M=2, so only two instances of duplicate packets are inserted at each point in burst 225. Duplicate 205 of the fifth packet is inserted after the fifth packet. There are no other duplicate packets at this point, so only a single duplicate is inserted. Duplicate 205 of the fifth packet and duplicate 210 of the tenth packet are inserted after the tenth packet. Following the fifteenth packet, however, duplicate 205 of the fifth packet is not inserted again. In this example, when the number of duplicate packets would exceed M, the earliest packet(s) in the burst are dropped from being duplicated. As such, duplicate 210 of the tenth packet and duplicate 215 of the fifteenth packet are inserted following the fifteenth packet and duplicate 205 of the fifth packet is not. Similarly, duplicate 215 of the fifteenth packet and duplicate 220 of the twentieth packet are inserted following the twentieth packet and duplicates 205 and 210 are not.

In one embodiment, one or more copies of each duplicated packet (e.g., as defined by X as described above) is inserted at the end of the burst of packets. For example, burst 230 does not include duplicates distributed throughout as illustrated in bursts 200 and 225. Instead, burst 230 only include the duplicates at the end of the burst. In another example, the burst of packets may include one or more duplicates immediately following the original packet (e.g., duplicate 205 following the fifth packet in the sequence) and at the end of the burst (e.g., duplicate 205 following the hundredth packet in the sequence) but not otherwise distributed throughout (e.g., no duplicate 205 following the tenth, fifteenth, etc. packets). In yet another example, as illustrated, burst 200 may include duplicates distributed throughout and at the end of the burst.

FIG. 3 is a flow chart illustrating exemplary method 300 of managing packet loss. At block 305, packet loss module 135 creates one or more duplicates of every Nth packet within a sequential set of packets. For example, as described with reference to FIG. 2, X duplicates may be created of every Nth packet. Packet loss module may use default values of X and N or set the values of X and N based upon an estimated packet loss value, as described with reference to block 350 below.

At block 310, packet loss module 135 stores the sequence numbers (or other identifiers that uniquely identify packets within a burst, hereinafter "sequence numbers") of the packets that were duplicated. These sequence numbers indicate "marker packets" that have an increased likelihood of being received and acknowledged by destination 125. The sequence numbers for these marker packets are saved to enable packet loss module 135 to compare them against sequence numbers received in acknowledgements from destination 125.

At block 315, packet loss module 135 transmits the sequential set of packets along with the duplicate copies to destination 125. As described with reference to FIG. 2, the duplicate copies may be inserted following the corresponding original copy, distributed throughout the sequence, and/or at the end of the set of packets.

At block 320, packet loss module 135 receives an acknowledgement from destination 125. For example, packet loss module 135 may receive an acknowledgement or selective acknowledgment according to *Internet Engineering Task Force (IETF) RFC 2018 TCP Selective Acknowledgment Options*. In one embodiment, the received acknowledgement includes the sequence number (or other unique identifier) of the packet received by destination 125.

At block 325, packet loss module 135 determines if the received acknowledgement includes the sequence number (or other unique identifier) of a duplicated marker packet. If the received acknowledgement does not include the sequence number of a duplicated marker packet, at block 330, packet loss module optionally stores a copy of the acknowledged non-duplicated packet sequence number(s) or otherwise updates a value representing acknowledged packets to track which packets have been successfully transmitted and do not need to be retransmitted.

At block 335, packet loss module 135 determines if additional packets within the set have yet to be acknowledged. If all packets have been acknowledged, method 300 returns to block 305 to transmit another burst of packets. If additional packets within the set have yet to be acknowledged, method 300 returns to block 320 to await additional acknowledgments.

If a received acknowledgement includes the sequence number of a duplicated marker packet, at block 340, packet loss module 135 determines if any non-duplicated packets that are prior to the duplicated packet in the sequence lack an acknowledgement. For example, packet loss module 135 may store acknowledged sequence numbers as described with reference to block 330 and determine which packets prior to the presently acknowledged packet are missing from that data structure or other representation. Alternatively, the received acknowledgement may indicate multiple sets of one or more packets received and, therefore, imply which packets have not been acknowledged.

In one embodiment, packet loss module 135 determines if any of the N−1 non-duplicated packets that are prior to the current duplicated packet in the sequence lack an acknowledgement. Using the example illustrated in FIG. 2, if packet loss module 135 receives acknowledgement of the tenth packet in the sequential set of packets and determines that the tenth packet has been duplicated (e.g., duplicate 210), packet loss module 135 determines if the sixth through ninth packets have been acknowledged (e.g., in burst 200, N=5, N−1=4, and the 4 packets prior to the tenth packet in the sequence are the sixth, seventh, eighth, and ninth packets). Alternatively, packet loss module 135 determines if any packets that are prior to the current duplicated packet in the sequence lack an acknowledgement (e.g., for acknowledgement of the tenth packet in burst 200, the first through the ninth packets are evaluated for lack of acknowledgement).

If prior packets are lacking acknowledgement, at block 345, packet loss module 135 retransmits copies of the prior packets determined to be lacking acknowledgement. As a result, packet loss module 135 is able to retransmit packets lacking acknowledgement in response to receiving acknowledgement of a duplicated marker packet and, e.g., without waiting for the expiration of a retransmission timer.

If no prior packets are lacking acknowledgment or following retransmission of unacknowledged packets, at block 350, packet loss module 135 optionally updates an estimated packet loss value for transmitting packets to destination 125. For example, packet loss module 135 may calculate a percentage or other value representing the packet loss for packets transmitted to destination 125. If one packet in a sequence of twenty is lost, packet loss module 135 may calculate a 5% packet loss value for transmitting packets to destination 125.

In one embodiment, the estimated packet loss value is mapped to a value of X and/or a value of N to be used when duplicating packets in subsequent bursts. For example, packet loss module 135 may utilize a data structure to map packet loss values, or ranges of packet loss values, to a value of X and/or a value of N. As the packet loss value increases, so do the value(s) of X and/or N. In one embodiment, packet loss module 135 determines if the packet loss value exceeds a threshold and, if so, determines that no duplication of packets is necessary. For example, if packet loss exceeds 12% or another threshold value, packet loss module 135 may determine that destination 125 is likely to lose a wireless connection or that retransmission of packets according to method 300 is not beneficial.

Following the optional block 350, method 300 returns to block 335 to determine if additional packets within the sequential set of packets remain to be acknowledged.

It will be apparent from this description that aspects of the inventions may be embodied, at least in part, in software. That is, packet loss module 135 and/or computer-implemented method 300 may be implemented or otherwise carried out in a computer system or other data processing system, such as nodes 110, 115, and/or 120, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. Thus, the techniques are not limited to any specific combination of hardware circuitry and software, or to any particular source for the instructions executed by a node 110, 115, and/or 120. It will also be appreciated that additional components, not shown, may also be part of nodes 110, 115, and/or 120, and, in certain embodiments, fewer components than that shown in FIG. 1 may also be used in nodes 110, 115, and/or 120.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards, solid state drives (SSD), or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention(s) have been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate virtualized resources or, in flow charts, optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
   determining an amount of packet loss in transmitting packets to a destination computing node;
   determining, based on the amount of packet loss, a duplication pattern for a plurality of packets to be transmitted to the destination computing node as a sequence of packets, wherein the duplication pattern includes (i) a number of candidate packets of the sequence of packets to be duplicated, (ii) a number of duplicates of each of the candidate packets, and (iii) a non-zero spacing between duplicates of each of the candidate packets;
   duplicating a first packet within the plurality of packets according to the duplication pattern, including generating one or more duplicates of the first packet and spacing the one or more duplicates within the plurality of packets according to the non-zero spacing;
   transmitting the plurality of packets including the one or more duplicates of the first packet to the destination computing node;
   receiving a first acknowledgement from the destination computing node; and
   in accordance with a determination that the first acknowledgement is directed to a duplicate of the first packet:
      in accordance with a determination that a second acknowledgement has yet to be received for each of a first one or more packets within the plurality of packets transmitted prior to the duplicate of the first packet, retransmitting the first one or more packets to the destination computing node.

2. The computer-implemented method of claim 1, further comprising calculating the number of candidate packets as a predetermined percentage of the amount of packet loss.

3. The computer-implemented method of claim 2, further comprising, in accordance with a determination that the amount of packet loss is more than a predetermined threshold, capping the number of candidate packets at a predetermined maximum value.

4. The computer-implemented method of claim 1, further comprising determining the non-zero spacing between the duplicates based on a predetermined minimum number of non-duplicated packets to be transmitted between duplicated packets.

5. The computer-implemented method of claim 1, further comprising duplicating the first packet after the sequence of packets.

6. The computer-implemented method of claim 1, wherein the duplication pattern further includes a respective number of the duplicates of each of the candidate packets.

7. The computer-implemented method of claim 1, further comprising:
   subsequent to retransmitting the first one or more packets to the destination computing node, determining a second amount of packet loss in transmitting the plurality of packets including the one or more duplicates of the first packet to the destination computing node;
   determining, based on the second amount of packet loss, a second duplication pattern for a second plurality of packets to be transmitted to the destination computing node as a second sequence of packets, wherein the second duplication pattern includes (i) a second number of candidate packets of the second sequence of packets to be duplicated, (ii) a second number of duplicates of each of the second number of candidate packets, and (iii) a second non-zero spacing between duplicates of each of the second number of candidate packets;
   duplicating a second packet within the second plurality of packets according to the second duplication pattern, including generating one or more duplicates of the second packet and spacing the one or more duplicates within the plurality of packets according to the second non-zero spacing; and
   transmitting the second plurality of packets including the one or more duplicates of the second packet to the destination computing node.

8. A non-transitory computer-readable medium storing instructions, which when executed by a processing device, cause the processing device to perform a method comprising:
   determining an amount of packet loss in transmitting packets to a destination computing node;
   determining, based on the amount of packet loss, a duplication pattern for a plurality of packets to be transmitted to the destination computing node as a sequence of packets, wherein the duplication pattern includes (i) a number of candidate packets of the sequence of packets to be duplicated, (ii) a number of duplicates of each of the candidate packets, and (iii) a non-zero spacing between duplicates of each of the candidate packets;
   duplicating a first packet within the plurality of packets according to the duplication pattern, including generating one or more duplicates of the first packet and spacing the one or more duplicates within the plurality of packets according to the non-zero spacing;
   transmitting the plurality of packets including the one or more duplicates of the first packet to the destination computing node;
   receiving a first acknowledgement from the destination computing node; and
   in accordance with a determination that the first acknowledgement is directed to a duplicate of the first packet:
      in accordance with a determination that a second acknowledgement has yet to be received for each of a first one or more packets within the plurality of packets transmitted prior to the duplicate of the first packet, retransmitting the first one or more packets to the destination computing node.

9. The non-transitory computer-readable medium of claim 8, further comprising calculating the number of candidate packets as a predetermined percentage of the amount of packet loss.

10. The non-transitory computer-readable medium of claim 9, further comprising, in accordance with a determination that the amount of packet loss is more than a predetermined threshold, capping the number of candidate packets at a predetermined maximum value.

11. The non-transitory computer-readable medium of claim 8, further comprising determining the non-zero spacing based on a predetermined minimum number of non-duplicated packets to be transmitted between duplicated packets.

12. The non-transitory computer-readable medium of claim 8, further comprising duplicating the first packet after the sequence of packets.

13. The non-transitory computer-readable medium of claim 8, the duplication pattern further includes a respective number of the duplicates of each of the candidate packets.

14. The non-transitory computer-readable medium of claim 8, further comprising:

subsequent to retransmitting the first one or more packets to the destination computing node, determining a second amount of packet loss in transmitting the plurality of packets including the one or more duplicates of the first packet to the destination computing node;

determining, based on the second amount of packet loss, a second duplication pattern for a second plurality of packets to be transmitted to the destination computing node as a second sequence of packets, wherein the second duplication pattern includes (i) a second number of candidate packets of the second sequence of packets to be duplicated, (ii) a second number of duplicates of each of the second number of candidate packets, and (iii) a second non-zero spacing between duplicates of each of the second number of candidate packets;

duplicating a second packet within the second plurality of packets according to the second duplication pattern, including generating one or more duplicates of the second packet and spacing the one or more duplicates within the plurality of packets according to the second spacing; and transmitting the second plurality of packets including the one or more duplicates of the second packet to the destination computing node.

15. An apparatus comprising:
a processing device; and
a memory coupled to the processing device, the memory storing instructions which, when executed by the processing device, cause the apparatus to:

determine an amount of packet loss in transmitting packets to a destination computing node;

determine, based on the amount of packet loss, a duplication pattern for a plurality of packets to be transmitted to the destination computing node as a sequence of packets, wherein the duplication pattern includes (i) a number of candidate packets of the sequence of packets to be duplicated, (ii) a number of duplicates of each of the candidate packets, and (iii) a non-zero spacing between duplicates of each of the candidate packets;

duplicate a first packet within the plurality of packets according to the duplication pattern, including generating one or more duplicates of the first packet and spacing the one or more duplicates within the plurality of packets according to the non-zero spacing;

transmit the plurality of packets including the one or more duplicates of the first packet to the destination computing node;

receive a first acknowledgement from the destination computing node; and in accordance with a determination that the first acknowledgement is directed to a duplicate of the first packet:

in accordance with a determination that a second acknowledgement has yet to be received for each of a first one or more packets within the plurality of packets transmitted prior to the duplicate of the first packet, retransmit the first one or more packets to the destination computing node.

16. The apparatus of claim 15, wherein the number of candidate packets is calculated as a predetermined percentage of the amount of packet loss.

17. The apparatus of claim 16, wherein, in accordance with a determination that the amount of packet loss is more than a predetermined threshold, the number of candidate packets is capped at a predetermined maximum value.

18. The apparatus of claim 15, wherein the non-zero spacing is calculated based on a predetermined minimum number of non-duplicated packets to be transmitted between duplicated packets.

19. The apparatus of claim 15, wherein the first packet is duplicated after the sequence of packets.

20. The apparatus of claim 15, wherein the duplication pattern further includes a respective number of the duplicates of each of the candidate packets.

* * * * *